PROCESS FOR DRYING POLYAMIDE-ACID/IMIDE FILM

Filed June 11, 1969

INVENTORS
JAMES FLAVIEL HEACOCK
ARTHUR WALTER SWEENEY
BY Claude J. Beaudoin
ATTORNEY United States Patent Office 3,600,361
Patented Aug. 17, 1971

3,600,361

PROCESS FOR DRYING POLYAMIDE-ACID/IMIDE FILM

James Flaviel Heacock, Circleville, Ohio, and Arthur Walter Sweeney, North Tonawanda, N.Y., assignors to E. I. du Pont de Nemours and Company, Wilmington, Del.

Filed June 11, 1969, Ser. No. 832,081
Int. Cl. C08g 20/32
U.S. Cl. 260—78TF 6 Claims

ABSTRACT OF THE DISCLOSURE

A process is provided for drying polyamide-acid/imide film wherein a gel-film structure is subjected to the simultaneous action of heat and pressure as by passing a gel-film of 9.5 mil thickness through a 4 mil nip of a pair of rotating nip rolls at a temperature of about 250° C. thereby to obtain a polyimide film.

Figure 1:
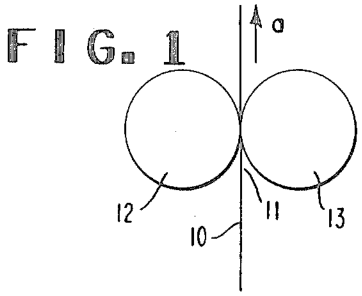

The present invention relates to the manufacture of polyimide film structures and, more particularly, is directed to a novel process for drying film structures of aromatic polyamide-acid/imide.

The process of the present invention is generally applicable to the production of polyimide film structures characterized by having the following recurring structural formula:

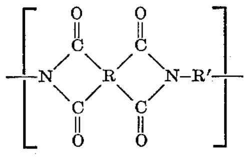
(1)

wherein R is a tetravalent radical containing at least two carbon atoms, no more than two carbonyl groups are attached to any one carbon atom; and wherein R′ is a divalent organic radical containing at least two carbon atoms.

The above-described polyimides are obtained by reacting at least one organic diamine having the structural formula:

$$H_2N—R'—NH_2 \quad (2)$$

wherein R′ is a divalent radical containing at least 2 carbon atoms, the two amino groups of said diamine each attached to separate carbon atoms of said divalent radical; with at least one tetracarboxylic acid dianhydride having the structural formula:

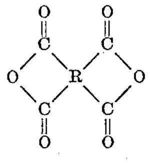
(3)

wherein R is a tetravalent radical containing at least 2 carbon atoms, no more than 2 carbonyl groups of said dianhydride attached to any one carbon atom of said tetravalent radical; in an organic solvent for at least one of the reactants, the solvent being inert to the reactants, preferably under anhydrous conditions, for a time and at a temperature below 175° C. sufficient to form a polyamide-acid having the following recurring structural formula:

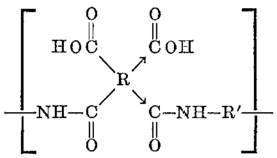
(4)

wherein R, R′ are as defined hereinabove and the arrows denote isomerism. Preferably, R is an aromatic radical and the four carbonyl groups are bonded in pairs directly to separate aromatic carbon atoms of said radical and each pair of carbonyl groups being attached to adjacent carbon atoms, and R′ is an aromatic radical and the two nitrogen atoms are bonded directly to aromatic carbon atoms of said radical.

Suitable representative dianhydrides from which R in Formulas 1, 3 and 4 above is derived include:

pyromellitic dianhydride;
2,3,6,7-naphthalenetetracarboxylic dianhydride;
3,3′,4,4′-diphenyltetracarboxylic dianhydride;
2,2′,3,3′-diphenyltetracarboxylic dianhydride;
2,2-bis(3,4-dicarboxylphenyl)propane dianhydride;
bis(3,4-dicarboxyphenyl)sulfone dianhydride;
3,4,9,10-perylenetetracarboxylic dianhydride;
bis(3,4-dicarboxyphenyl)ether dianhydride;
naphthalene-1,4,5,8-tetracarboxylic dianhydride;
decahydronaphthalene-1,4,5,8-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxylic dianhydride;
phenanthrene-1,8,9,10-tetracarboxylic dianhydride;
cyclopentane-1,2,3,4-tetracarboxylic dianhydride;
pyrazine-2,3,5,6-tetracarboxylic dianhydride;
2,2-bis(2,3-dicarboxyphenyl) propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis-(3,4-dicarboxyphenyl)methane dianhydride;
benzene-1,2,3,4-tetracarboxylic dianhydride;
thiophene-2,3,4,5-tetracarboxylic dianhydride;
butane-1,2,3,4-tetracarboxylic dianhydride;
cyclohexane-1,2,4,5-tetracarboxylic dianhydride;
cyclobutane-1,2,3,4-tetracarboxylic dianhydride;
dimethylcyclobutane-1,2,3,4-tetracarboxylic dianhydride;
tetramethylcyclobutane-1,2,3,4-tetracarboxylic dianhydride;
ethane-1,1,2,2-tetracarboxylic dianhydride;
tricyclo[4,2,2,$0^{2,5}$]dec-7-ene-3,4,9,10-tetracarboxylic dianhydride;
2,3,2′,3′-benzophenonetetracarboxylic dianhydride;
3,4,3′,4′-benzophenonetetracarboxylic dianhydride;
benzoylpyromellitic dianhydride;
6-(3′,4′-dicarboxybenzoyl)-2,3-naphthalene dicarboxylic dianhydride;
4′-(3″,4″-dicarboxybenzoyl)-3,4-diphenyl dicarboxylic dianhydride;
4-(3′,4′-dicarboxybenzoyloxy)phthalic dianhydride;
4-(3′,4′-dicarboxybenzamido)phthalic dianhydride;
bis(3,4-dicarboxyphenyl) sulfide dianhydride;
3,4,3′,4′-azobenzenetetracarboxylic dianhydride;

2,2-bis(3,4-dicarboxyphenyl)-1,1,1-trifluoroethane dianhydride;
2,2-bis(3,4-dicarboxyphenyl)hexafluoropropane dianhydride;
2,2-bis(3,4-dicarboxyphenyl)-1-chloro-1,1,3,3,3-pentafluoropropane dianhydride;
2,2-bis(3,4-dicarboxyphenyl)-1,3-dichloro-1,1,3,3-tetrafluoropropane dianhydride;
2,2-bis(3,4-dicarboxyphenyl)-1,1,3,3-tetrachloro-1,3-difluoropropane dianhydride; etc., and mixtures thereof.

Suitable representative diamines from which R′ in Formulas 1, 2 and 4 above is derived include:

meta-phenylenediamine;
para-phenylenediamine;
2,2-bis(4-aminophenyl)propane;
4,4′-diaminodiphenylmethane;
benzidine;
4,4′-diaminodiphenyl sulfide;
4,4′-diaminodiphenyl sulfone;
3,3′-diaminodiphenyl sulfide;
3,3′-diaminodiphenyl sulfone;
4,4′-diaminodiphenyl ether;
2,6-diaminopyridine;
bis-(3-aminophenyl)diethyl silane;
N,N-bis(4-aminophenyl)methylamine;
1,5-diaminonaphthalene;
3,3′-dimethyl-4,4′-diaminobiphenyl;
3,3′-dimethoxybenzidine;
2,4-bis(beta-amino-t-butyl)toluene;
bis-(para-beta-amino-t-butylphenyl)ether;
para-bis-2-(2-methyl-4-aminopentyl)benzene;
para-bis(1,1-dimethyl-5-aminopentyl)benzene;
m-xylylenediamine;
p-xylylenediamine;
bis(para-aminocyclohexyl)methane;
hexamethylene diamine;
heptamethylenediamine;
octamethylenediamine;
nonamethylenediamine;
decamethylenediamine;
3-methylheptamethylenediamine;
4,4′-dimethylheptamethylenediamine;
2,11-diaminododecane;
1,2-bis(3-aminopropoxy)ethane;
2,2-dimethylpropylenediamine;
3-methoxyhexamethylenediamine;
2,5-dimethylhexamethylenediamine;
2,5-dimethylheptamethylenediamine;
5-methylnonamethylenediamine;
1,4-diaminocyclohexane;
1,12-diaminooctadecane;
2,5-diamino-1,3,4-oxadiazole;
$H_2N(CH_2)_3S(CH_2)_3NH_2$;
$H_2N(CH_2)_3N(CH_3)(CH_2)_3NH_2$;
3,3′-dichlorobenzidine;
bis-(4-aminophenyl)ethyl phosphine oxide;
bis-(4-amino-phenyl)phenyl phosphine oxide;
N,N-bis-(4-aminophenyl)aniline;
4,4′-diaminobenzophenone;
3,3′-diaminobenzophenone;
3,4′-diaminobenzophenone;
4-aminophenyl 3-aminobenzoate;
4,4′-diaminoazobenzene;
3,3′-diaminoazobenzene;
N,N-bis(4-aminophenyl)-n-butylamine;
m-aminobenzoyl-p-aminoanilide;
1,1-bis(4-aminophenyl)ethane;
4,4′-diaminodiphenyl sulfoxide;
2,2-bis(4-aminophenyl)hexafluoropropane;
2,2-bis(4-aminophenyl)-1,3-dichloro-1,1,3,3-tetrafluoropropane; etc.

and mixtures thereof.

The polyamide-acid solution, generally about a 15% to 20% solids composition, is then cast into film form and treated with a conversion reagent such as acetic anhydride and a tertiary amine catalyst such as pyridine, which promotes imidization, and the film structure thereafter is subjected to heat treatment to complete imidization to the polyimide of Formula 1 above. In one modification of the film forming process, the polyamide-acid solution is cooled to a low temperature, e.g. about 0° C., and mixed with appropriate quantities of conversion reagent and tertiary amine catalyst, and the composition is cast into film form on a heated support such as a drum or belt at a temperature of, for example, 100° C. so that the conversion reagent and catalyst become active to effect imidization of a sufficient number of amide-acid units to imide units whereby the polymer becomes insoluble and the film becomes tough, rubbery and self-supporting. During such mild treatment, only a very small, indeed negligible, amount of solvent is lost from the film. Accordingly, the film is highly swollen with the polyamide-acid solvent and other volatiles, and is termed a gel-film. This self-supporting gel-film can be stripped from the support and heat-processed to complete the imidization and drying thereof.

The above described polyamide-acid and polyimides are described in greater detail in, for example, U.S. Pat. Nos. 3,179,614; 3,179,630; 3,179,632; 3,179,633 and 3,179,634. The processes for heat-treating polyamide-acid film structure thereby to obtain polyimide film structures are described in greater detail in, for example, U.S. Pat. No. 3,410,826 and U.S. patent application Ser. No. 444,382 (filed Mar. 31, 1965), and now abandoned.

A major drawback, and problem encountered heretofore in heat-treating polyamide-acid gel-film structures is the inability to remove or diffuse the solvent or volatiles in the gel-film structure at an acceptable or satisfactory rate. This problem is further aggravated and compounded by so-called "skin formation" on the outer surfaces of the gel-film structure during its heat treatment. To explain further, as the gel-film is heated, the surface layers thereof heat up first and the consequent loss of solvent and higher degree of imidization in this portion of the film structure results in a tough surface layer or "skin" which is formed before the innermost portions of the gel-film become heated. When continued heating is too rapid, diffusion through the tough "skin" is not sufficiently rapid to permit removal of the volatiles contained therein, and bubble formation and film rupture result. This problem has been avoided heretofore only by drying the gel-film at a slow rate dictated by the rate of diffusion of solvent and volatiles through the "skin" that forms on the film. This is obviously undesirable since it is uneconomic.

According to the present invention there is provided a process for heat-treating a gel-film structure of polyamide-acid which comprises subjecting said gel-film structure to the simultaneous action of heat and pressure thereby to obtain a polyimide film structure. In one of its preferred aspects, the process of the present invention comprises passing a gel-film structure of polyamide-acid through the nip of at least one pair of coacting nip rollers.

Figure 2:
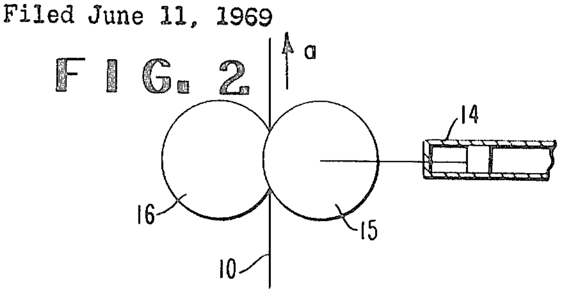
Figures 3, 4, 5, 7, 8:
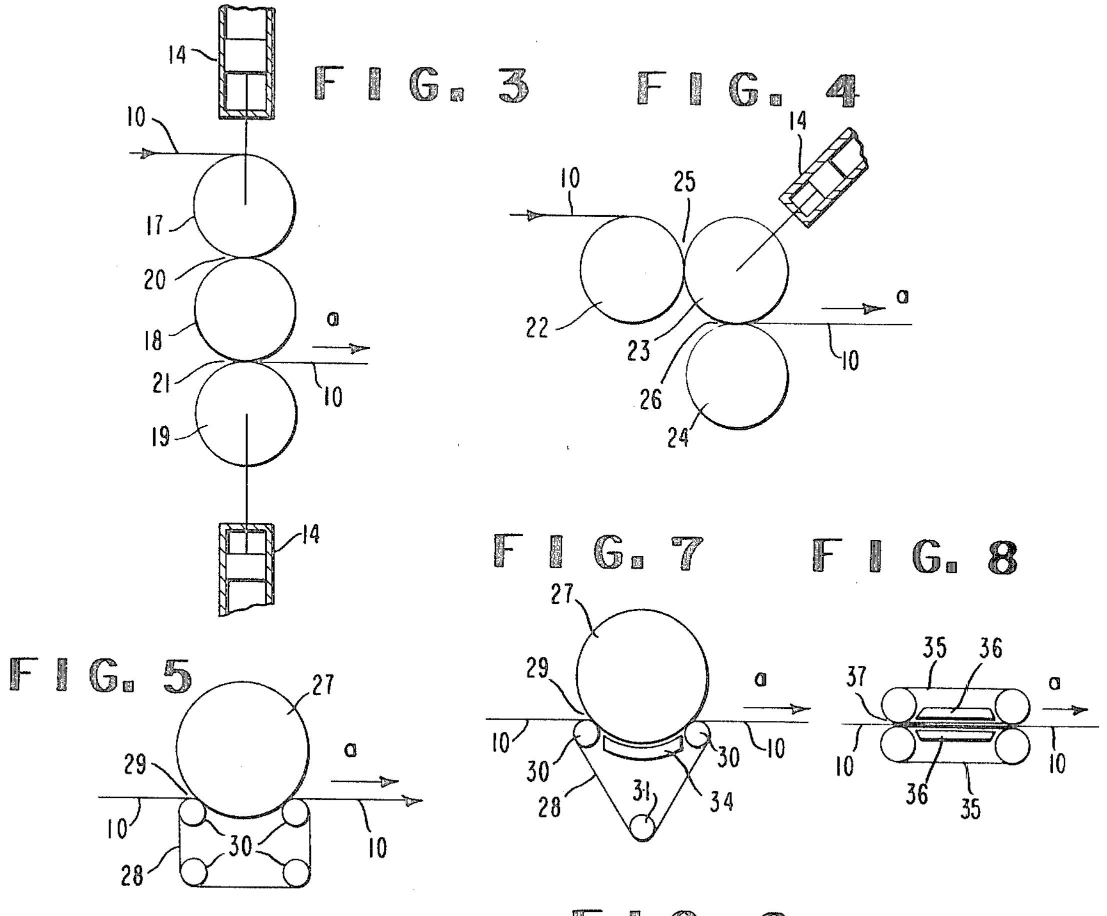

The nature and advantages of the process of the present invention will be more clearly understood by the following description and the several figures illustrated in the accompanying drawings in which:

FIG. 1 is a schematic representation of a nip roll device which may be utilized for practicing the process of the present invention;

FIG. 2 schematically depicts another nip roll device useful for practicing the process of the present invention;

FIG. 3 schematically depicts an organization of a plurality of rollers useful for practicing the process of the present invention;

FIGS. 4 to 9 schematically depict yet other organizations of devices useful for practicing the process of the present invention.

The process provided by the present invention is specifically adapted to the heat-treatment of gel-film structures of polyamide-acid. The gel-film thickness ordinarily is between about 1.5 and about 400 mils.

The term "gel-film" as used herein means a thin sheet of the polymeric material which is laden with volatiles, primarily solvent, to such an extent that the polymeric material is in a swollen, plasticized, rubbery condition. The volatile content of the gel-film ranges usually between about 80% and about 90% by weight, based upon the total gel-film weight, and the polymer content ranges usually between about 10% and about 20% by weight, based upon the total weight of the gel-film.

The gel-film stage is that stage at which the film structure becomes self-supporting so that it can be stripped from the support on which it was cast and heated. The solvent content at which a given polymer will form a gel-film structure depends to some extent on the amide-acid/imide ratio of the polymer, and the molecular weight of the polymer. As the imide content of the polymer increases, and as the molecular weight increases, a gel-film structure will form at higher solvent content. For example, a 15% solids composition of a typical polyamide-acid polymer having an inherent viscosity of 1.0 or higher becomes a self-supporting gel-film when between about 40% and about 50% of the repeating units in the polymer have been cyclized to imide units. At higher solids content, polymer compositions become self-supporting gel-films at lower imide content. It should be noted that while a gel-film is ordinarily a self-supporting film which is between about 10% and about 20% by weight solids and between about 80% and about 90% by weight volatiles, it is clear that any film remains self-supporting at any higher percent solids and that the process of this invention is equally applicable to any self-supporting, volatile-containing films until they have been completely dried.

The term "polyamide-acid" as used herein means the customary polyamide-acid as defined hereinabove and is intended to include compositions thereof that are partially but incompletely cured as, for example, compositions that are at an intermediate stage of curing from polyamide-acid to polyimide. For purposes of the present invention, the term polyamide-acid includes the term "polyamide-acid/imide," the latter having a more restricted definition meaning compositions which have an amide-acid-to-imide ratio between about 90:10 and about 10:90.

A salient feature of the process of the present invention resides in the discovery that subjecting gel-film structures as above defined to the simultaneous action of heat and pressure totally unexpectedly and surprisingly provides an efficient means for drying such film structures. In the novel process of the present invention, a gel polyamide-acid/imide film is subjected to the simultaneous action of heat and pressure, during which treatment imidization is completed and the film structure is dried. A convenient method for subjecting the film structure to such treatment is by passing it through the nip of a pair of coacting rotating heated nip rolls. Referring now to FIG. 1, a gel-film structure 10 travels in a continuous manner in the direction indicated by arrow *a* through the nip 11 between drying rolls 12 and 13. Both of drying rolls 12 and 13 are suitably mounted for rotation in, for example, fixed positions, and the rolls are suitably spaced whereby a pressure is applied to the gel-film 10 travelling through nip 11 between the rolls. The specific arrangement of the drying rolls is not an essential requirement and any arrangement that facilitates maintaining a pressure force upon the gel-film structure is indeed satisfactory. Any specific number of drying rolls is not an essential requirement, and obviously the total number of drying rolls utilized will be chosen on the basis of obtaining satisfactory drying performance consistent with economic considerations. Satisfactory results have been obtained utilizing several pairs such as, for example, two to five pairs, of drying rolls such as 12 and 13 in a serial or sequential arrangement.

Either one, and preferably both, of drying rolls 12 and 13 depicted in FIG. 1 may be heated by any suitable means such as, for example, circulating heated water, oil or steam through each selected drying roll. The operating temperature of the drying rolls while conducting the process of the present invention may be up to 500° C. More specifically, in the final stages of drying, that is, for about the last 10% of the volatiles to be removed from the gel-film structure, temperatures as high as 400–500° C. may be employed since polyimide film is able to survive exposure to such high temperatures. Temperatures at which either the film structure or the volatiles in the film structure decompose are naturally to be avoided. In the case of the film indicated above for illustrative purposes, the preferred temperature range of the drying rolls is between about 300° C. and about 450° C. Drying rolls 12 and 13 are fabricated of a suitable corrosion resistant metal such as, for example, stainless steel.

Other apparatus arrangements for conducting the process of the present invention are shown in FIGS. 2 to 9. FIG. 2 depicts a pair of nip rolls consisting of a metallic roll 15 and a roll 16 fabricated of a resilient material such as rubber or an elastomer. Roll 15 in FIG. 2 is shown being urged towards roll 16 by piston and rod assembly 14. The resilient roll in this arrangement is not heated because of the low heat conductivity of most resilient materials. The apparatus of FIG. 2 offers the advantage of longer contact time of the drying rolls with the film structure 10 travelling in the nip therebetween.

In addition to use in pairs, drying rolls may be used in multiple combinations to produce a plurality of nips. Here again, one or more of the rolls may be elastomeric rather than metal, provided that the two rolls of any cooperating pair of rolls are not both elastomeric. In FIG. 3, rotatably mounted rolls 17, 18 and 19 are so disposed as to provide two nips 20 and 21 through which film structure 10 travels. In FIG. 4, drying rolls 22 and 24 are rotatably mounted in fixed positions, and rotatably mounted roll 23 is operatively connected to piston and rod assembly 14 which is adapted to apply a force for urging roll 23 against fixed rotating rolls 22 and 24 and provide two pressure nips 25 and 26 through which film structure 10 travels.

FIG. 5 depicts a cooperating roll 27 and a flexible travelling endless belt 28 assembly. The endless belt 28 is driven by a series of rollers 30, and belt 28 and roll 27 cooperate to form an extended nip 29 through which film 10 passes. Endless belt 28 is fabricated of heat resistant flexible material which maintains a high degree of strength under tension. One such highly suitable material is stainless steel. Pressure in the nip may be effected in either of two ways. Rollers 30 may be mounted to rotate in fixed positions, and roll 27 may be placed under a load or force to press against endless belt 28. Alternatively, roll 27 may be mounted to rotate in a fixed position, and one or more of the rollers 30 may be adjustably rotatably mounted so as to enable the tension of endless belt 28 to be adjusted whereby to force it more firmly against film structure 10 and roll 27. Either roll 27 or endless belt 28 or both may be heated. Endless belt 28 may be heated by hot air, radiant heaters, flame or other standard means.

Figure 6:
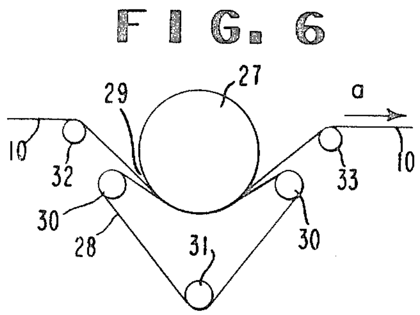

The apparatus of FIG. 6 is similar to that of FIG. 5, except that the pressure in the nip 29 is effected solely by adjusting the tension of endless belt 28 as by suitably adjusting the position of roller 31. Rolls 32 and 33 are idler rollers adapted to guide film structure 10 into and out of nip 29.

The apparatus depicted in FIG. 7 also is similar to that shown in FIG. 6, except for pressure plenum 34 which is adapted to press against endless belt 28 thereby to urge endless belt 28 against film 10 and roll 27 and increase the pressure in the nip 29. Pressure plenum 34 is preferably coated on its upper surface which contacts endless belt 28 with a low friction material such as polytetrafluoroethylene.

FIG. 8 depicts apparatus wherein film 10 advances between two suitably driven endless travelling belts 35. Two pressure plenums 36, shown mounted adjacent each endless belt 35, are each adapted to press against the respective endless belt and urge each towards the other, thereby to adjust the pressure on film 10 travelling through nip 37. Here again, any or all of the endless belts 35 and pressure plenums 36 may be heated.

Figure 9:
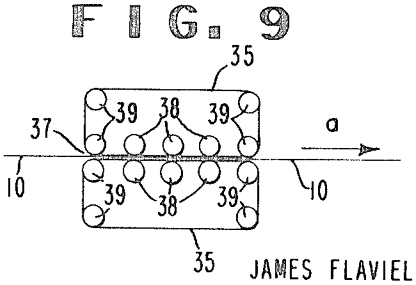

The apparatus depicted in FIG. 9 is similar to that shown in FIG. 8, but in this instance the pressure plenums have been replaced by rotatably mounted rollers 38 adapted to coact in pairs to press against endless belts 35 and effect the pressure on film 10 travelling through nip 37. Endless belts 35 are adapted to travel continuously around rotatably mounted rollers 39; any one or all of rollers 39 may be driven for advancing endless belts 35.

The drying apparatus above described is ordinarily enclosed in a chamber which serves to confine the vapors and volatile materials released from the drying film structure travelling therethrough so that these may be recovered and in some cases reused.

The essential feature of the process of the present invention is that the polyamide-acid/imide film structure be subjected to the combined action of heat and pressure. This essential and necessary requirement of the invention is clearly shown by the fact that treating a 9.5-mil gel-film of 16% solids content by (1) passing it through a 4-mil nip of the apparatus of FIG. 1 at room temperature (25° C.) resulted in removal of only between about 15% and about 21% of the volatile content of the film. Treating the same film by (2) passing it through a 9.5-mil nip of the same apparatus but at 250° C. also resulted in only a very small reduction in volatile content. In direct contrast to the foregoing, treating the same film by (3) passing it through a 4-mil nip of the same apparatus at 250° C. resulted in removal of about 86% of the volatile content of the film structure in one pass.

The temperature of the gel-film structures when treated in accordance with the process of the present invention may vary over a wide range depending upon the process conditions and the gel-film employed. The temperature of the gel-film structure at which it will be treated is influenced to a large extent by the boiling point of the volatile material being removed from the gel-film structure. Generally speaking, gel-film structure having volatile materials of higher boiling points will be subjected to higher temperatures of treatment. The temperature of the gel-film structure should, however, be maintained below the boiling point (at the pressure level of treatment) of the particular volatile material being removed therefrom in order to avoid impairing the surface appearance of the film structure that is ultimately obtained by the process. For example, a gel polyamide-acid/imide film structure of 20% solids and about 9.5 mils thick and laden primarily with N,N-dimethylacetamide (DMAC) can be satisfactorily treated in accordance with the process of the present invention when subjected to temperatures between about 250° C. and about 260° C. to provide a polyimide film of about 1-mil thickness. At temperatures above about 265° C. a torn film is obtained which has a bubbled appearance apparently because the vapor pressure of the volatiles exceeded the strength of the gel-film when the pressure is released. Temperatures below about 250° C., down as low as 100° C. or even 50° C., also can be used, and while operable in the sense that the volatile content of the film structure will be decreased, the amount of volatiles removed is sufficiently small at the lower temperatures that the process becomes inefficient and uneconomic. Temperatures above the boiling point at atmospheric pressure of DMAC are preferred.

The pressure to which the gel-film structures will be subjected when treated in accordance with the process of the present invention also may vary over a wide range depending upon the process conditions and the gel-film employed. The important role of pressure in the process of the present invention is readily seen from the fact that passing a gel-film structure between heated nip rolls spaced sufficiently far apart so that no pressure is applied to the gel-film structure results in only a negligible decrease in the volatile content of the gel-film structure. It is, however, not very practicable to specify any specific pressure or range of pressures to which the gel-film structure is subjected, since the rubbery gel-film structure deforms under the influence of pressure rolls and accumulation of liquid in the nip of a nip roll device obscures the point of contact of the nip rolls on the gel-film structure. The pressure exerted by the nip rolls on the gel-film structure cannot readily be calculated without fairly precise knowledge of the area of contact between the nip rolls and the gel-film structure. For this reason, the treatment to which the gel-film structure is subjected can better be described by specifying the size of the gap spacing or nip between the nip rolls in relation to the thickness of the gel-film structure to be treated.

In the case of the gel polyamide-acid/imide film structure of 20%-solids and about 9.5 mils thick indicated hereinabove the gap or nip may be as narrow as 2 to 3 mils. Thus, the gap or nip may be in the range between about 25% and about 99% of the gel-film thickness. A smaller gap leads to destruction of the gel-film by splitting, tearing, fibrillating, etc. The smallest operable gap cannot, however, be employed at the preferred temperature. Thus, at the preferred temperatures in the range of 240–260° C., the optimum gap size was found to be in the range of 4–5 mils. or between about 40% and about 60% of the film thickness. At lower temperatures, in the range of about 150° C., smaller gaps down to about 2–3 mils, that is, down to about 25% of the film thickness are operable, but removal of volatiles is not as efficient as under the preferred conditions.

The contact time during which the gel-film structure is subjected to heat and pressure is not critical so long as sufficient contact time is provided for adequate heat transfer. Since the length of the contact between the gel-film structure and the nip roll cannot be accurately measured as pointed out above, the contact time cannot be given with absolute precision. Contact times in the range of 0.1–0.5 second have been employed for the most part, and contact times well below 0.1 second will bring about useful results, especially with the thinner gel-films in which heat transfer considerations are not of the same magnitude as in the case of the thicker gel-films.

As indicated hereinabove, the gel-film thickness may vary from as little as 2 mils up to as high as 50 mils or more. In this range of gel-film thickness, the opening of the nip can be between about 25% and about 99% of the gel-film thickness, but the nip is preferably in the range between about 40% and about 60% of the gel-film thickness. With thicker films, the time needed for conduction of heat to the inner portions of the gel-film is greater, and longer contact time is effected by increasing contact time at each nip, by increasing the number of nips, or by other means described below.

It should be observed that practicing the process of the present invention utilizing the apparatus described hereinabove and illustrated in the accompanying drawings is advantageous because the treatment of the gel-film structures can easily be continued until the gel-film is dried to whatever volatile content is desired and is essentially completely imidized. In the process utilizing two or more sets of nip rolls, the temperature of each succeeding set may be somewhat greater than the preceding set. A higher temperature is permissible because the volatile content of the gel-film has decreased in each succeeding nip roll set and by virtue of the higher solids and higher degree of imidization, the gel-film is stronger and tougher and thus is less prone to yield to formation of bubbles. The amount of increase in temperature at each succeeding set of nip rolls is easily determined by a visual examination of the film, as too high a temperature will cause defects such as bubbles in the film. In like manner, the nip spacing of succeeding sets of nip rolls may be less than that of the preceding pair of nip rolls. The first set of nip rolls are adjusted to provide a nip spacing between about 25% and about 99% of the gel-film thickness. For each succeeding set of nip rolls, the nip spacing is between X% and 99% of the film thickness, where X is greater than 25%, since the film becomes less easily deformed under pressure with increasing percent solids and degree of imidization. At the last set of nip rolls, whereat the film is almost dry, the nip spacing is between about 75% and about 99% of the film thickness.

The volatiles which are removed from polyamide-acid/imide film by the process of the present invention are of a wide variety. The term "volatiles" or "volatile content" is used in its normal sense to include any type of volatile substance regardless of its nature which is removed by volatilization, although the volatile content will generally be primarily the solvent or solvents used as the medium for the polymerization reaction. It includes therefore not only the solvent or polymerization medium, but also excess conversion reagent, by-products of the conversion reagent, catalysts, diluents which may have been employed in adding the various reagents or catalysts, solvents or non-solvents introduced during solvent exchange or washing operations, plasticizers, etc.

Illustrative but not exhaustive of the volatiles which can be in the film to be treated by the process of the present invention can be mentioned the following: N,N-dialkylcarboxylamides such as N,N-dimethylformamide, N,N - diethylformamide, N,N - dimethylacetamide, N,N-diethylacetamide, N,N-dimethylmethoxy acetamide, N-methyl caprolactam, etc.; dimethylsulfoxide, N-methyl-2-pyrrolidone, tetramethyl urea, pyridine, dimethylsulfone, hexamethyl-phosphoramide, tetramethylene sulfone, formamide, N-methyl-formamide, butyrolactone and N-acetyl-2-pyrrolidone; saturated hydrocarbons such as hexane, cyclohexane, decane, etc.; aromatic hydrocarbons such as benzene, toluene, xylene, naphthalene, etc.; ethers such as diethyl ether, furan, dioxane, anisole, etc.; nitriles such as acetonitrile, benzonitrile, etc.; esters such as butyl acetate, ethyl propionate, etc.; ketones such as methyl ethyl ketone, acetophenone, etc.; anhydrides such as acetic anhydride, propionic anhydride, benzoic anhydride, ketene, etc.; carboxylic acids such as acetic acid, butyric acid, benzoic acid, etc.; tertiary amines such as pyridine, isoquinoline, 3,5-lutidine, N,N-dimethyldodecylamine, N-ethylmorpholine, N,N - dimethylcyclohexylamine, etc.; phenols such as phenol, p-cresol, 2,5-xylenol, etc.; alcohols such as methanol, ethanol, hexyl alcohol, benzyl alcohol, etc.; halogenated compounds such as chloroform, methylene chloride, carbon tetrachloride, trichlorotrifluoroethane, chlorobenzene, bromobenzene, etc.; volatile plasticizers such as diethyl phthalate, dimethyl suberate, etc.; dimethyl cyanamide; water; etc.

The particular advantage of the novel process of the present invention is that it is effective, fast, highly efficient and easily controllable. The process yields a treated film structure which is substantially free of bubbles and low in voids. The combination of heat and pressure results in efficient heating of the film structure to its innermost portions before any significant loss of volatiles from the film structure occurs so that upon release of the pressure the volatiles are flashed off in such a way that no skin is formed. There is a lower degree of neckdown in the width of the film structure during drying by the process of the present invention as compared to loss of width in film dried unrestrained in prior art processes. Thus, the process of the invention permits the drying of film structures without the need for a tenter frame to maintain film width, and edge trim losses are accordingly smaller. Furthermore, the compact low investment apparatus suitable for practicing the process of the invention contrasts markedly with the bulky high investment ovens previously required.

The principle and practice of the present invention will now be illustrated by the following examples which are exemplary only and it is not intended that the invention be limited thereto since modifications in technique and operation will be apparent to anyone skilled in the art.

EXAMPLE 1

A gel-film of polyamide-acid/imide based on pyromellitic dianhydride and 4,4'-diaminodiphenyl ether was prepared by slowly adding in portions 218 gms. (1.0 mol) of pyromellitic dianhydride (PMDA) to a solution maintained below 60° C. of 200 gms. (1.0 mol) of 4,4'-diaminodiphenyl ether (DDE) in 2369 gms. of N,N-dimethylacetamide (DMAC). The resulting 15% solids solution of polyamide-acid was cooled to 0° C., and while maintaining this temperature, 408 gms. (4.0 mols) of acetic anhydride and 186 gms. (2.0 mols) of beta-picoline were mixed in. The resulting composition was cast onto a drum heated at 100° C. in a thickness of about 9.5 mils and hold there for about 10 seconds, after which it was stripped from the drum as a self-supporting gel polyamide-acid/imide film. As a result of exudation of a small amount of liquid from the gel-film, the percent solids increased to 16.8% solids at the point when the film was used in these examples.

Samples of the above described gel polyamide-acid/imide film having a thickness of 8.5 to 9.5 mils and containing primarily N,N-dimethylacetamide (DMAC) and lesser amounts of betapicoline, acetic acid and acetic anhydride, were passed in the nip between a pair of driven spaced rolls as shown in FIG. 1. The rolls were 6-inch diameter, electrically heated, steel rolls. Table I below summarizes the process conditions and the results obtained. A nip opening given as a range, e.g. 4–5 mils, means that the nip rolls were set such that a 4-mil feeler gauge would pass between the rolls but a 5-mil feeler gauge would not pass through. The effect on the film was determined by weighing each film sample in a closed container before and after treatment, and calculating the increase in solids. Film thickness was measured with an Ames gauge.

TABLE I

| Sample | Nip opening (mils) | Roll surface temp., ° C. | Film speed (ft./min.) | Final film thickness (mils) | Final percent solids |
|---|---|---|---|---|---|
| 1 | 5 | 25 | 6.2 | 8.5 | ---------- |
| 2 | 2–3 | 25 | 6.2 | 5.9–6.1 | 17.7 |
| 3 | 1.5–2 | 25 | 6.2 | 3.6 | 20.2 |
| 4 | 4–5 | 150 | 5.2 | 4.0 | 28.6 |
| 5 | 4–5 | 150 | 13.3 | 4.5 | 22.2 |
| 6 | 3–4 | 150 | 5.2 | 3.2 | 29.2 |
| 7 | 2–3 | 150 | 5.2 | 2.1–2.2 | 32.7 |
| 8 | 1.5–2 | 150 | 5.2 | (1) | (1) |
| 9 | 3–4 | 200 | 5.2 | ---------- | 45.7 |
| 10 | 2–3 | 200 | 4.7 | ---------- | 56.5 |
| 11 | 2–3 | 210 | 9.4 | ---------- | 38.5 |
| 12 | 4–5 | 250 | 5.2 | ---------- | 60.6 |

[1] Film disintegrated.

It was observed during these runs that there was no tendency for the film to stick to the rolls, and that at these temperatures there was no foaming or blistering of the film. At the smaller nip openings, some elongation of the film in the machine direction, and some width increase (transverse direction) were observed. The film did not tend to neck-in or shrink to any significant extent after exiting from the nip.

EXAMPLE 2

Samples of gel-film similar to those employed in Example 1 were treated with heat and pressure in the same manner as in that example, but in this case each sample gel-film was passed through the nip two or more times, the nip being closed down to a narrower spacing for successive passes as appropriate. The results are summarized in Table II below. In Sample 1, some blisters were produced in the film because the temperature was a little too high in the first pass.

TABLE II

| Sample [1] | Initial film thickness (mils) | Nip opening (mils) | Roll surface temp., ° C. | Film speed (ft./min.) | Final film thickness (mils) | Final percent solids |
|---|---|---|---|---|---|---|
| 1a | 9.5 | 6–7 | 265 | 5.5 | 3.2–3.5 | 49.8 |
| 1b | 3.2–3.5 | 2–3 | 265 | 5.5 | 1.8 | 79.0 |
| 1c | 1.8 | 1.5–2 | 265 | 5.5 | | 89.0 |
| 2a | 9.5 | 4–5 | 240–245 | 5.5 | 1.6 | 51.9 |
| 2b | 1.6 | 1.5 | 240–245 | 5.5 | | 86.8 |
| 3a | 9.5 | 4–5 | 240–245 | 5.5 | 1.5 | |
| 3b | 1.5 | 1.5 | 240–245 | 5.5 | 0.9 | 92.0 |
| 4a | 9.5 | 4–5 | 240–245 | 5.5 | | |
| 4b | | 1.5 | 240–245 | 5.5 | | |
| 4c | | <1.5 | 240–245 | 5.5 | 0.9–1.0 | 95.2 |
| 5a | 9.5 | 4–5 | 245 | 5.5 | | |
| 5b | | 1.5 | 245 | 5.5 | | |
| 5c | | | 245 | 5.5 | | 95.3 |
| 5d | | 1.0 | 245 | 5.5 | 0.9–1.0 | 98.4 |

[1] Samples designated "a" were passed once through indicated nip opening; samples designated "b" were sample a subjected to a second treatment; samples designated "c" were sample b subjected to a third treatment; samples designated "d" were sample c subjected to a fourth treatment.

EXAMPLE 3

A continuous roll of 9.5 mil gel-film like that used in Example 1 was run through the same equipment at 4.9 ft./min. In the first pass, with a nip of 4–5 mils and a nip roll surface temperature of 165–170° C., the percent solids in the gel-film was increased to 29.2%, and the film was 3.5 mils thick. A small loss in film width from 4⅝ inch to 3⅞ inch was observed. In the second pass, with a nip of 2–3 mils and a nip roll surface temperature of 230–235° C., the percent solids in the gel-film was increased to 79%, but some splitting of the film was observed at this size gap. In an alternate second pass, with the same roll surface temperature but a nip opening of 3–4 mils, the percent solids was increased to 66.4%, and there was no film failure.

In the first pass of this run, when the film was passed vertically downward through the nip, a small pool of liquid collected in the nip. When the film was passed upward through the nip, the liquid drained down away from the nip. It is preferred to pass the film upward through the nip.

EXAMPLE 4

Samples of 9.5-mil gel-film like that used in Example 1 were given one pass through the equipment used in that example, with a nip setting of 4–5 mils and a nip roll surface temperature of 240° C., at a film speed of 5.5 ft./min. (essentially as in the first pass of Sample 2a in Table II). The resulting films were restrained in both planar directions on frames, and placed in an oven at 300° C. for 30 minutes in order to complete drying and imidization. The physical properties of these films were measured and averaged. The tensile strength was 22.8K p.s.i. in the machine direction (MD) and 10.1K p.s.i. in the transverse direction (TD). The modulus was 556K p.s.i. in the MD and 297K p.s.i. in the TD.

EXAMPLE 5

Similar to Example 4, a sample of the same 9.5-mil gel-film was put through one pass in the same apparatus with a nip setting of 4–5 mils, a roll surface temperature of 240° C., and a film speed of 5.5 ft./min. The resulting film was clamped to a frame, but restrained in the MD only, and heated in an oven at 300° C. for 30 minutes to complete drying and imidization. This film has a tensile strength of 29.3K p.s.i. in the MD and a modulus of 618K p.s.i. in the MD.

EXAMPLE 6

Samples of 9.5-mil, 15% solids gel-film of polyamide-acid/imide based on pyromellitic dianhydride and 4,4'-diaminodiphenyl ether, containing primarily N,N-dimethylacetamide (DMAC) and lesser amounts of beta-picoline, acetic acid and acetic anhydride, were passed through the nip between a pair of 6-inch driven nip rolls rotating in fixed positions. One roll was metal and was heated by passing hot oil through it; the other roll was rubber. The rolls were so positioned that when passing the 9.5 mil gel-film between them, the contact between the nip rolls and the gel-film was approximately 0.5 inch. Various roll speeds were used to vary the contact time, and the metal nip roll temperature also was varied. The effect of the process treatment on the film samples was determined by drying the treated films in an oven, weighing them before and after so that the solids content could be calculated. Table III below shows the results of several samples treated in this example.

TABLE III

| Sample | Roll speed (r.p.m.) | Oil temp., ° C. | Roll surface temp., ° C. | Estimated contact time (sec.) | Percent solids |
|---|---|---|---|---|---|
| 1 | 10 | 155 | 150 | 0.15 | 19.4 |
| 2 | 7 | 155 | 150 | 0.2 | 20.4 |
| 3 | 5 | 155 | 150 | 0.3 | 20.6 |
| 4 | 5 | 210 | 200 | 0.3 | 24.2 |
| 5 | 10 | 210 | 200 | 0.15 | 20.2 |
| 6 | 10 | 265 | 243 | 0.15 | 21.6 |
| 7 | 5 | 270 | 246 | 0.3 | 34.7 |

EXAMPLE 7

Samples of gel-film similar to that used in Example 6 but having 17% solids were passed between the nip rolls described in that example. In this case, some samples were put through the nip several times before determining the effect on the film. In all runs a roll speed of 3 r.p.m. was used; at this speed, the estimated contact time was 0.4 sec. per pass. The results are listed in Table IV below.

TABLE IV

| Sample | Oil temp., ° C. | Roll surface temp., ° C. | Number of passes | Percent solid |
|---|---|---|---|---|
| 1 | 200 | 190 | 5 | 50.5 |
| 2 | 200 | 190 | 10 | 81.2 |
| 3 | 265 | 245 | 1 | 28.9 |
| 4 | 265 | 245 | 5 | 85.6 |
| 5 | 265 | 245 | 10 | 90.5 |

What is claimed is:

1. A process for heat-treating film structures of polyamide-acid polymeric material which comprises subjecting a gel-film structure of polyamide-acid obtained by reacting at least one organic diamine with at least one tetracarboxylic acid dianhydride to the simultaneous action of elevated temperatures of at least about 50° C. and positive pressure thereby to obtain a polyamide film structure.

2. The process of claim 1 wherein said gel-film structure is characterized by between about 10% and about 20% by weight, based upon the total gel-film weight, of said polyamide-acid polymer and between about 80% and about 90% by weight, based upon the total gel-film weight, of volatile material.

3. The process of claim 2 wherein said gel-film structure is between about 1.5 mils and about 400 mils thick.

4. The process of claim 3 wherein said volatile material is N,N-dimethylacetamide.

5. The process of claim 4 wherein said gel-film structure is subjected to a temperature up to about 260° C.

6. A process for heat-treating film structures of polyamide-acid polymeric material which comprises subjecting a gel-film structure of polyamide-acid obtained by reacting at least one organic diamine with at least one tetracarboxylic acid dianhydride to the simultaneous action of elevated temperatures of at least about 50° C. and positive pressure by passing said gel-film structure through the nip between at least two cooperatively disposed coacting rotatable nip rollers, at least one of said nip rollers heated to a predetermined temperature effective for removing volatile material from said gel-film structure.

References Cited

UNITED STATES PATENTS

| | | | |
|---|---|---|---|
| 3,179,634 | 4/1965 | Edwards | 260—78 |
| 3,410,826 | 11/1968 | Endrey | 260—78 |
| 3,428,602 | 2/1969 | Haller | 260—78 |
| 3.476,705 | 11/1969 | Hansen | 260—78 |
| 3,502,762 | 3/1970 | Haller | 260—78 |

HAROLD D. ANDERSON, Primary Examiner

U.S. Cl. X.R.

260—47CZ, 65R, 95R, 96R

PO-1050
(5/69)

UNITED STATES PATENT OFFICE
CERTIFICATE OF CORRECTION

Patent No. 3,600,361 Dated August 17, 1971

Inventor(s) James Flaviel Heacock & Arthur Walter Sweeney

It is certified that error appears in the above-identified patent and that said Letters Patent are hereby corrected as shown below:

Column 12, line 66, "polyamide" should read -- polyimide --.

Signed and sealed this 25th day of April 1972.

(SEAL)
Attest:

EDWARD M.FLETCHER,JR.
Attesting Officer

ROBERT GOTTSCHALK
Commissioner of Patents